United States Patent [19]

Larker et al.

[11] Patent Number: 5,080,843
[45] Date of Patent: Jan. 14, 1992

[54] METHOD OF MANUFACTURING AN OBJECT OF A POWDERED CERAMIC MATERIAL

[75] Inventors: Hans Larker; Bertil Mattsson, both of Robertsfors, Sweden

[73] Assignee: ABB Cerama AB, Robertsfors, Sweden

[21] Appl. No.: 587,096

[22] Filed: Sep. 24, 1990

[30] Foreign Application Priority Data

Sep. 26, 1989 [SE] Sweden .................... 8903156

[51] Int. Cl.⁵ ............................ C04B 33/32
[52] U.S. Cl. ........................ 264/62; 264/63
[58] Field of Search .................. 264/62, 570, 63

[56] References Cited

U.S. PATENT DOCUMENTS

| 4,568,516 | 2/1986 | Adlerborn et al. | 264/62 |
| 4,579,703 | 4/1986 | Adlerborn et al. | 264/62 |
| 4,647,414 | 3/1987 | Mizumo et al. | 264/62 |
| 4,717,535 | 1/1988 | Adlerborn et al. | 264/570 |
| 4,778,650 | 10/1988 | Hermansson et al. | 264/570 |

FOREIGN PATENT DOCUMENTS 2048952 12/1980 United Kingdom .

Primary Examiner—James Derrington
Attorney, Agent, or Firm—Watson, Cole, Grindle & Watson

[57] ABSTRACT

An object is manufactured from a powdered ceramic material while using isostatic pressing. The powdered material is thereby supplied with a temporary organic binder and is formed into a preformed powder body (10). A major part of the binder is removed from the preformed powder body by driving off under heating, whereas a minor part of the binder, required for keeping the powder body together, is retained in the powder body. The powder body is provided with a gas-permeable embedding material (14) of glass, the retained minor part of the binder then being removed by additional driving off under heating and preferably by also treating the powder body with the surrounding gas-permeable embedding material with an oxidizing gas. The gas-permeable embedding material is then made gas-impermeable by heating and the preformed powder body, freed from binder, with the surrounding gas-impermeable embedding material is subjected to isostatic pressing.

7 Claims, 1 Drawing Sheet

METHOD OF MANUFACTURING AN OBJECT OF A POWDERED CERAMIC MATERIAL

FIELD OF THE INVENTION

The present invention relates to a method of manufacturing an object of a powdered ceramic material while using isostatic pressing.

BACKGROUND OF THE INVENTION

When manufacturing objects of ceramic materials by sintering together powder while using isostatic pressing, the powder is normally preformed into a manageable powder body. For the preforming there may be used, inter alia, conventional technique for the manufacture of ceramic goods, such as, e.g. injection moulding. The powdered ceramic material is then usually mixed, prior to the forming, with a temporary binder, for example a wax. After the preforming, the binder is driven off by heating, usually in vacuum, so that the preformed powder body is, in all essentials, free from binder before it is subjected to further treatment.

When the preformed body is subjected to the isostatic pressing at the sintering temperature, it must, in order to give a desired dense, sintered product, be enclosed in a casing or embedding material which, during the pressing, is able to prevent the pressure medium used, normally a gas, from penetrating into the powder body. The embedding material as well as its contents are freed from nondesirable gases during some process stage before the sealing. A known gas-permeable embedding material consists of particles of glass arranged as a layer on the preformed body, another known embedding material consists of particles of glass arranged as a mass, into which the preformed body is embedded. Such embedding materials of glass are made gas-impermeable by melting the glass. They are described, inter alia, in Swedish patent specifications 7600919-0 (publication No. 396 371) and 7813018-4 (publication No. 414 921).

After driving off the temporary binder from the bodies which have been formed from the powdered material by heating and vacuum treatment, it has proved that the preformed bodies obtained contain a carbonized residue of a few tenths of a per cent. In several ceramic materials, inter alia in silicon nitride, this carbonized residue may reduce the strength of the objects obtained by isostatic pressing of the preformed bodies. This, of course, entails a considerable disadvantage when it comes to objects in which the strength is of critical importance, such as in radial and axial turbines.

Removing the carbonized residue by oxidation at a temperature required for oxidation has proved to entail a drastic deterioration of the strength of the preformed body, so that this becomes insufficient for encapsulation of the body in an embedding material of glass. Resorting to a sintering of the body in order to improve the strength has proved to entail detrimental deformations of the objects manufactured during the isostatic pressing, especially in parts of the objects having thin and projecting portions, such as turbine wheel blades. Furthermore, the presintering has resulted in cracks occurring to a greater extent in the preformed bodies, which has led to increased scrapping.

SUMMARY OF THE INVENTION

According to the present invention, it has proved to be possible to eliminate the described problems and to manufacture pressed and sintered objects with excellent reproducibility with the use of isostatic pressing. The present invention also involves advantages when manufacturing objects of such materials, for example titanium diboride, in which the occurrence of carbonized residue in preformed bodies does not reduce the strength of the finished isostatically pressed products, because also in this case an improved manageability and less scrapping of preformed powder bodies are achieved.

According to the present invention, the favorable results are achieved because the temporary binder is not removed in its entirety from the preformed powder body before it is provided with the gas-permeable embedding material of glass, but a minor portion is retained in the powder body and is removed only when the powder body is surrounded by the gas-permeable embedding material.

More particularly, the present invention relates to a method of manufacturing an object of a powdered ceramic material while using isostatic pressing, the powdered material being supplied with a temporary organic binder and being formed into a preformed powder body from which binder is removed by driving off under heating, whereupon the preformed powder body is provided with a gas-permeable embedding material of glass, the gas-permeable embedding material being made gas-impermeable by heating and the preformed body with the surrounding gas-impermeable embedding material being subjected to the isostatic pressing, which is characterized in that a major part of the binder is removed before the preformed powder body is provided with the gas-permeable embedding material, whereas a minor part of the binder, required for keeping the powder body together, is retained in the powder body and is removed at least substantially completely therefrom when the powder body is provided with the surrounding gas-permeable embedding material.

BRIEF DESCRIPTION OF THE DRAWINGS

The invention will be explained in greater detail, by way of examples, with reference to the accompanying drawings, wherein.

DETAILED DESCRIPTION OF THE INVENTION

Figure 1:
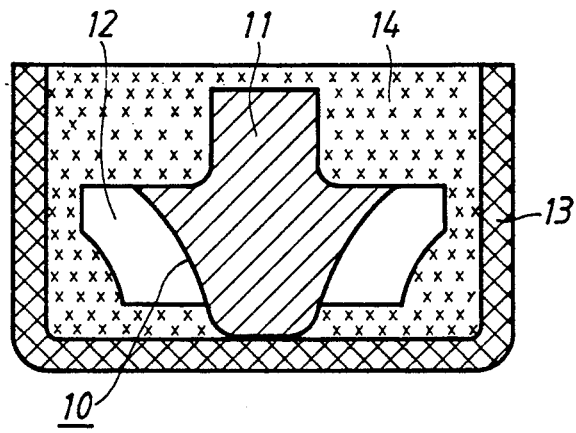
FIG. 1 shows an axial section of a body, preformed from the powdered material, in the form of an exhaust gas turbine arranged in a gas-permeable embedding material of glass for the removal of retained temporary binder.

When manufacturing objects of such ceramic materials in which carbonized residues reduce the strength, considerably higher strengths of finished isostatically pressed objects are achieved if the binder is removed from the powder body, which is provided with the gas-permeable embedding material, by treating the powder body and the surrounding embedding material with an oxidizing gas. This may suitably take place by flushing the gas, for example air diluted with nitrogen gas or argon gas with a low mixture of oxygen gas, through the oven or other heating device in which the powder body with embedding material is stored during the removal of the binder.

According to an advantageous embodiment of the invention, the preformed powder body with the remaining temporary binder is arranged in a gas-permeable embedding material by being embedded into a mass of particles of glass in a vessel with gas-permeable walls, for example, a vessel built up of sintered-together particles of glass, preferably of the same glass as in the embedding material. Arranged in this way, the remaining binder may be effectively driven off from the powder body before the surrounding embedding material in the next process stage is made gas-impermeable and the preformed powder body is subjected to isostatic pressing.

As examples of ceramic materials, to which the present invention is applicable, may be mentioned nitrides such as silicon nitride, silicon aluminium oxide nitride, aluminium nitride, titanium nitride, zirconium nitride, chromium nitride, boron nitride, metal oxides such as aluminium oxide, zirconium oxide, both fully and partially stabilized, magnesium oxide, carbides such as silicon carbide, titanium carbide, boron carbide, borides such as titanium boride, zirconium boride and mixtures of such materials.

As examples of temporary binders for the preformed body may be mentioned polyolefins such as polyethylene, polypropylene and copolymers of ethylene and propylene with a waxy consistency, polymeric organic esters such as ethylene vinyl acetate polymers and butyl methacrylate polymers, cellulose compounds such as methyl cellulose and cellulose nitrate, waxes and mixtures of two or more of the exemplified substances. The quantity of temporary binder suitably amounts to 30-60% and preferably to 35-50% of the total volume of ceramic material and temporary binder.

Of the total amount of temporary binder included in the preformed powder body before any binder has been removed, the main part is driven off under heating, preferably under vacuum, whereas suitably 5-30% and preferably 10-25% is retained in the powder body which is thereafter provided with the glass embedding material.

As material in the embedding material, a glass with a melting point and viscosity adapted to the task is chosen. As examples of suitable kinds of glass, which may be used for most ceramic materials, may be mentioned a glass containing 80.3 per cent by weight $SiO_2$, 12.2 per cent by weight $B_2O_3$, 2.8 per cent by weight $Al_2O_3$, 4.0 per cent by weight $Na_2O$, 0.4 per cent by weight $K_2O$ and 0.3 per cent by weight CaO (Duran ®, Pyrex ®), a glass containing 58 per cent by weight $SiO_2$, 9 per cent by weight $B_2O_3$, 20 per cent by weight $Al_2O_3$, 5 per cent by weight CaO and 8 per cent by weight MgO, a glass containing 96.7 per cent by weight $SiO_2$, 2.9 per cent by weight $B_2O_3$ and 0.4 per cent by weight $Al_2O_3$ (Vycor ®), a glass containing 46-50 per cent by weight $SiO_2$, 48-52 per cent by weight $B_2O_3$ and 1.5-2.5 per cent by weight $Al_2O_3$, as well as other kinds of glass containing at least 50 per cent by weight $B_2O_3$ such as a glass containing 38 per cent by weight $SiO_2$, 60 per cent by weight $B_2O_3$ and 2 per cent by weight $Al_2O_3$.

For the manufacture of the preformed body 10, shown in FIG. 1, with hub 11 and a plurality of blades 12, 60 parts by volume silicon nitride powder with a mean grain size of 1 μm (e.g. quality Hl from H C Starck, Fed. Rep. of Germany), containing 1.1 part by weight yttrium oxide, are mixed with 40 parts by volume of a temporary binder consisting of 32.4 parts by volume paraffin with a melting temperature of 58°-60° C., 6.9 parts by volume ethylene vinylacetate polymer with a melt flow index of 400 g/10 min (ASTM 1238, Modified) and a density of 0.951 (e.g. Elvax ®, Du Pont), and 0.7 parts by volume Carnaubavax. The mixture of silicon nitride and binder is formed by injection moulding into the preformed body 10.

From the preformed powder body there is removed, with the powder body placed in an oven, the major part, 80%, of the binder by driving off in vacuum (around 0.1 millibar) under successive, slight temperature increase, on average about 1.5° C. per hour, up to 350° C. and while maintaining the powder body at this temperature for about 5 hours. The powder body is then placed, in accordance with FIG. 1, in a vessel 13 of porously sintered glass powder and is embedded into an embedding material 14 of glass powder. The glass in the vessel 13 and the glass in the embedding material 14 are of the same kind and contain 80.3 per cent by weight $SiO_2$, 12.2 per cent by weight $B_2O_3$, 2.8 per cent by weight $Al_2O_3$, 4.0 per cent by weight $Na_2O$, 0.4 per cent by weight $K_2O$ and 0.3 per cent by weight CaO (Pyrex ®). The particle size of the glass is in both cases 0.1-1 mm. Because the vessel is porously sintered, it is permeable to gas.

The vessel 13 with contents is placed in an oven, where it is rapidly heated to and kept at 350° C. for a few hours while maintaining a vacuum (around 0.1 millibar) in the oven space. During continued maintained vacuum, the temperature is successively raised, on average about 15° C. per hour, up to 600° C., this temperature being maintained for about 5 hours. After that, the evacuation is interrupted and the oven space is flushed with air diluted with four parts nitrogen gas per part of air for about 2 hours. During this treatment the remainder of the temporary binder is driven off from the powder body. The binder, which has thereby been decomposed while forming carbon, disappears by oxidizing away the carbon. Because of the permeability of the vessel 13 to gas, the air oxygen may pass through the walls of the vessel and be brought into efficient contact with the powder body and gaseous oxidation products formed may escape more easily. However, the process is realizable per se by using a vessel of solid glass.

Figure 2:
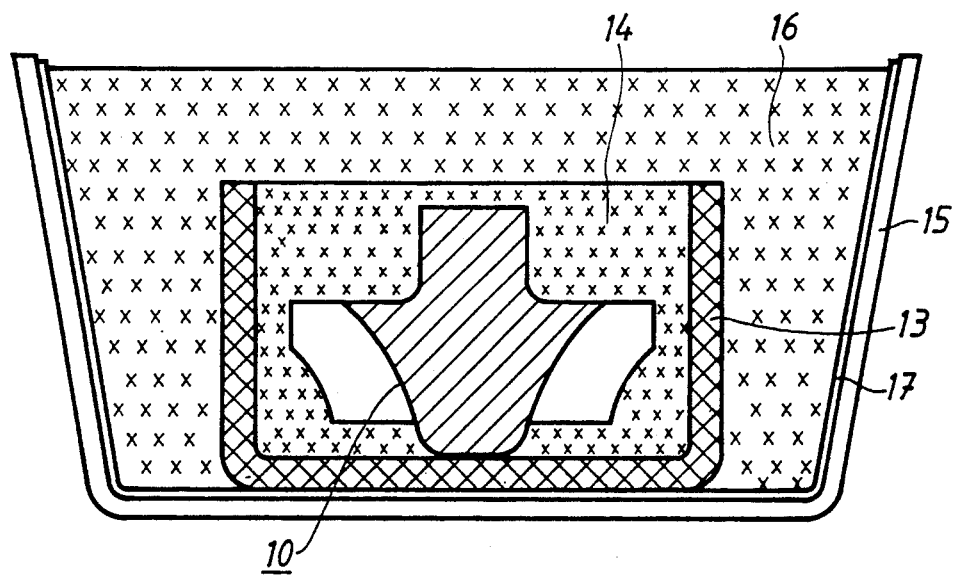
FIG. 2 shows the preformed body with the surrounding embedding material of glass arranged to undergo isostatic pressing.

The vessel 13 with contents, in which the powder body 10 is now free from temporary binder, is placed, in accordance with FIG. 2, in an open-topped vessel 15 of graphite and provided with a supplementary embedding material 16 in the form of a powder of the same kind as in the embedding material 14. The vessel is internally provided with a release layer 17 of boron nitride. If the bottom of the vessel is not gas-tight, a plate of gas-tight graphite, gas-tight boron nitride or molybdenum foil is placed in the bottom of the vessel, after the release layer 17 has been applied. One or more vessels 15 are placed in a high pressure oven. Argon, helium or nitrogen gas is supplied to this oven so that the pressure is 0.1 MPa when the temperature has been raised to 1150° C. The temperature is maintained at this level for 1 hour, the glass in the embedding materials 14 and 16 and in the vessel 13 then forming a melt with a relatively low viscosity which completely surrounds the powder body 10. At the same temperature, argon, helium or nitrogen gas is then supplied to a pressure level which provides a pressure of 200-300 MPa at the final sintering temperature. The temperature is then raised to 1750°-1800° C., i.e. to a suitable sintering temperature for the silicon nitride for a period of 1 hour. At the same time the pressure then rises. A suitable time for sintering under the above-mentioned conditions is at least 2 hours. After a completed cycle, the oven is allowed to cool to a suitable discharge temperature, and the embedding materials 14, 16 are removed from the finished exhaust gas turbine.

We claim:

1. A method of manufacturing an object of a powdered ceramic material, comprising providing the powdered material with a temporary organic binder, shaping the powdered material provided with the temporary binder into a preformed body, removing a major part of the binder from the preformed body by driving it off under heating while retaining 5-30 percent of the binder in the preformed body, embedding the preformed body with the retained part of the binder in a gas-permeable embedding material consisting of particles of glass in a vessel of glass, removing the retained part of the binder of the preformed body by driving it off under heating while embedded in the gas-permeable embedding material in the vessel of glass, making the gas-permeable embedding material gas-impermeable, and subjecting the preformed body embedded in the gas-impermeable embedding material to isostatic pressing.

2. A method according to claim 1, wherein the binder is removed from the powder body provided with the gas-permeable embedding material by treating the powder body with the surrounding embedding material with an oxidizing gas.

3. A method according to claim 2, wherein the vessel with gas-permeable walls is a vessel built up of sintered-together particles of glass.

4. A method according to claim 3, wherein glass of the same kind is used in the vessel as in the embedding material.

5. A method according to claim 2, wherein the vessel of glass has gas-permeable walls.

6. A method as claimed in claim 1, wherein the vessel of glass, with its contents after the retained part of the binder has been at least substantially completely removed from the preformed body embedded in the gas-impermeable material, is provided with supplementary gas-permeable embedding material consisting of particles of glass, and the gas-permeable embedding materials are made gas-impermeable by forming a melt thereof before the preformed body embedded in the melt is subjected to the isostatic pressing.

7. A method as claimed in claim 1, wherein 10-25 percent of the binder is retained after the step of removing a major part of the binder.

* * * * *